United States Patent [19]
Rodriguez et al.

[11] Patent Number: 5,447,248
[45] Date of Patent: Sep. 5, 1995

[54] INDICATOR FOR LIQUID CONTAINER

[76] Inventors: Kimberly J. Rodriguez; Jimmy Rodriguez, both of P.O. Box 16155, Bellemont, Ariz. 86015

[21] Appl. No.: 186,535

[22] Filed: Jan. 26, 1994

[51] Int. Cl.[6] ..................... B65D 23/16; B65D 25/56
[52] U.S. Cl. ..................... 215/366; 215/11.2; 215/13.1; 116/228; 250/462.1; 250/463.1; 374/142; 374/156
[58] Field of Search ............ 215/11.2, 365, 366; 116/228; 250/462.1, 463.1; 374/142, 148, 150, 156, 161

[56] References Cited

U.S. PATENT DOCUMENTS

| | | | |
|---|---|---|---|
| 576,658 | 2/1897 | Coffin | 215/366 |
| 745,942 | 12/1903 | Wickins | 250/463.1 X |
| 2,090,749 | 8/1937 | Corsi et al. | |
| 2,091,605 | 8/1937 | McCarty | 215/11.2 |
| 2,356,267 | 8/1944 | Pelunis | 250/463.1 |
| 2,614,430 | 10/1952 | Ballard et al. | 250/462.1 X |
| 3,520,189 | 7/1970 | Mann | 374/156 |
| 3,910,441 | 10/1975 | Bramming | |
| 4,022,060 | 5/1977 | Rebhan | |
| 4,215,785 | 8/1980 | Schwaiger | 215/11.6 |
| 4,302,971 | 12/1981 | Luk | |
| 4,358,955 | 11/1982 | Rait | 374/142 X |
| 4,402,195 | 9/1983 | Campbell | |
| 4,838,083 | 6/1989 | Blomquist | |
| 4,867,325 | 9/1989 | Dransfield | 215/11.2 |
| 4,878,588 | 11/1989 | Ephraim | 215/365 X |
| 4,919,983 | 4/1990 | Fremin | 215/11.2 X |
| 5,000,581 | 3/1991 | Yata et al. | 215/11.2 X |
| 5,044,509 | 9/1991 | Petrosky et al. | 215/366 |
| 5,156,284 | 10/1992 | del Pilar Pla Rodriguez et al. | 215/11.6 |

FOREIGN PATENT DOCUMENTS

| | | | |
|---|---|---|---|
| 163233 | 6/1949 | Austria | 215/11.2 |
| 259326 | 5/1913 | Germany | 215/365 |
| 3836424 | 7/1989 | Germany | 215/11.2 |
| 11968 | 10/1885 | United Kingdom | 215/11.2 |

*Primary Examiner*—Sue A. Weaver
*Attorney, Agent, or Firm*—Richard C. Litman

[57] ABSTRACT

The instant invention provides a liquid container that may be configured as an insulated container or vacuum flask. The liquid container may indicate the temperature and remaining amount of liquid within the container. The liquid container may include a housing surrounding a beverage compartment in fluid communication with a transparent tube. A float may be retained within the transparent tube by stop elements located at the top and bottom of the tube. A graduated scale may be located on the exterior of the housing and associated with the float to indicate a liquid level within the beverage chamber. The float may be configured as a temperature-sensitive spherical element that indicates the temperature of the remaining beverage in the container. A cholesteric liquid crystal deposit, luminescent or fluorescent material that changes color or emits light in the range of 60° to 212° for a beverage such as hot coffee.

10 Claims, 3 Drawing Sheets

INDICATOR FOR LIQUID CONTAINER

BACKGROUND OF THE INVENTION

1. Field of the Invention

The present invention relates to an indicator for a liquid container, and more particularly, to a temperature and liquid level indicator for an insulated bottle or vacuum bottle.

2. Description of the Prior Art

Liquid containers are popular for carrying a user's favorite beverage. It is known to provide an insulated bottle or vacuum bottle for maintaining the temperature of a beverage close to an initially hot or cold temperature. It is also known to provide an indicating mechanism to indicate various conditions of the liquid within a bottle, i.e., sensing the temperature of a liquid within the container or indicating the liquid level remaining in the bottle. However, no compact inexpensive container is known for providing plural functions, such as sensing a temperature and determining the level of a liquid within a bottle.

Corsi et al. in U.S. Pat. No. 2,090,749 discloses a nursing bottle including a mechanism indicating the amount of milk or other substance contained in the bottle. A slot may be cut in a casing so the contents of the bottle may be viewed through the slot. Indices may be imprinted along the slot to indicate the contents in the bottle. The scale may indicate fluid ounces.

Bramming in U.S. Pat. No. 3,910,441 discloses a vacuum insulated bottle utilizing a wide opening vacuum filler. Rehban in U.S. Pat. No. 4,022,060 discloses an infant's feeding bottle including an indicating device such as a thermometer or graduated scale that is detachably carried on the wall of the bottle.

Luk in U.S. Pat. No. 4,302,971 discloses a liquid crystal temperature indicator for measuring human body temperature. The temperature indicator may be a cholesteric liquid crystal deposit with a coating to protect the deposit from attack by moisture or humidity.

Campbell in U.S. Pat. No. 4,402,195 discloses a drinking mug having a heat maintenance chamber that may contain a heating or cooling liquid. The selection of a heating or cooling liquid is based on the particular beverage to be consumed. Blomquist in U.S. Pat. No. 4,838,083 discloses a float activated gauge for indicating the level of liquid in a tank. The float may be configured as a plastic ball.

Dransfield in U.S. Pat. No. 4,867,325 discloses a baby bottle having a generally toroidal hollow chamber. One or more liquid crystal temperature sensing dots may be molded into the side of the bottle to sense overheated contents within the bottle.

Yata et al. in U.S. Pat. No. 5,000,581 discloses a nursing bottle having a detachable case including a thermosensor for measuring the temperature of a liquid within the bottle.

del Pilaf Pla Rodriguez et al. in U.S. Pat. No. 5,156,284 discloses a thermally insulated baby bottle for maintaining the liquid contents at an initial hot or cold temperature for extended periods of time. A window is provided in a wall of the baby bottle and associated with a graduated scale for determining the amount of liquid remaining in the bottle.

None of the above inventions and patents, taken either singly or in combination, is seen to describe the instant invention as claimed.

SUMMARY OF THE INVENTION

The present invention is a liquid container that is inexpensive to manufacture and maintain. According to the present inventino, a liquid container include an insulated container or vacuum flask that indicates the temperature and remaining amount of liquid within the container.

Accordingly, it is a principal object of the invention to provide a liquid container with few parts and is durableand easy to use.

It is another object of the invention to provide a liquid container that readily shows the temperature and level of liquid remaining in a container.

It is an object of the invention to provide improved elements and arrangements thereof in an apparatus for the purposes described which is inexpensive, dependale and fully effective in accomplishing its intended purposes.

The instant invention provides a liquid container that may be configured as an insulated container or vacuum flask. The liquid container may indicate the temperature and remaining amount of liquid within the container. The liquid container may include a housing surrounding a beverage compartment in fluid communication with a transparent tube. A float may be retained within the transparent tube by stop elements located at the top and bottom of the tube.

A graduated scale may be located on the exterior of the housing and associated with the float to indicate a liquid level within the beverage chamber. The float may be configured as a temperature-sensitive spherical element that indicates the temperature of the remaining beverage in the container. A cholesteric liquid crystal deposit, luminescent or fluorescent material that changes color or emits light in the range of 60° to 212° for a beverage such as hot coffee.

These and other objects of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

Figure 1:
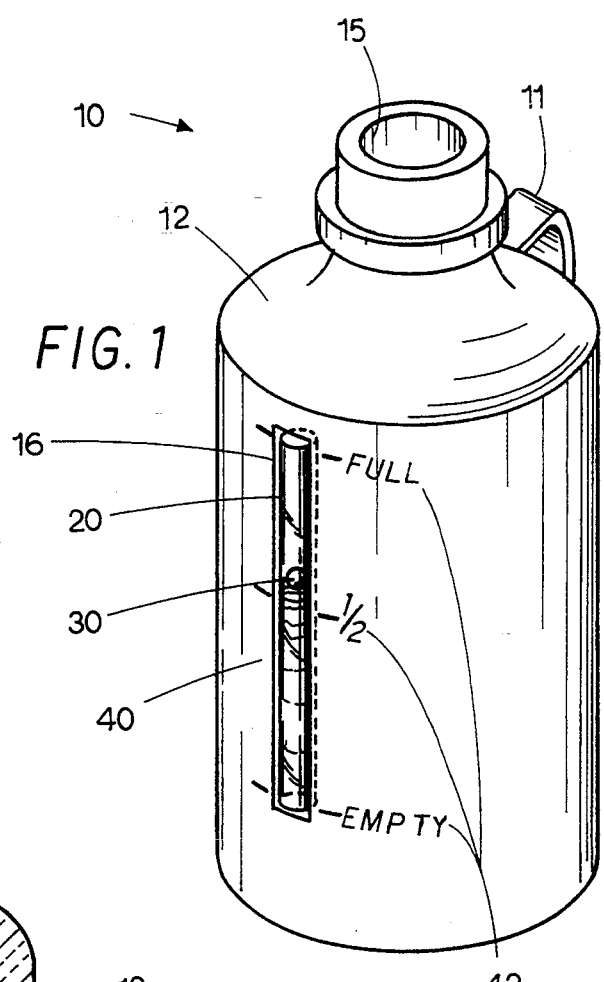
FIG. 1 is a perspective view of a liquid container having a handle and an indicating mechanism according to the invention.
Figure 2:
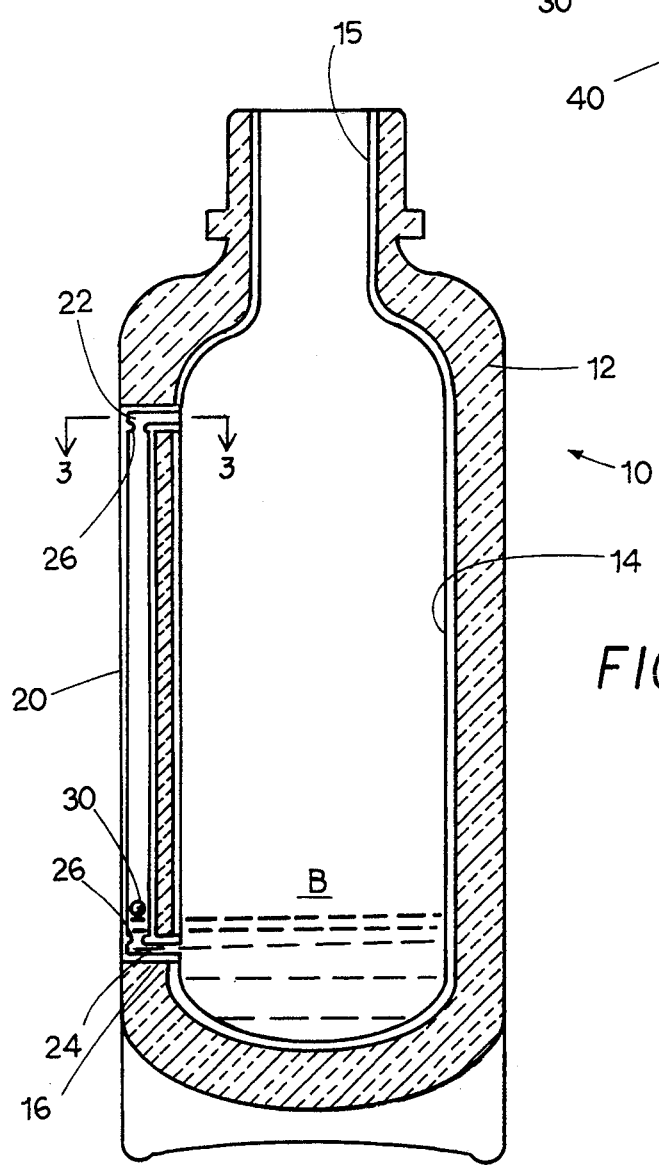
FIG. 2 is a cross-sectional view of a second embodiment of a liquid container according to the invention.

FIGS. 1 and 2 show a liquid container 10 containing a beverage B such as hot coffee. Liquid container 10 includes a handle 11 and a housing 12 of insulated material. A beverage chamber 14 may be formed of glass or plastic. The beverage chamber includes a mouth or opening 15 that accepts the hot beverage when filling the container, and also serves to dispense the beverage. Housing 12 may include a slot 16 configured to receive a tube 20.

Tube 20 is made of transparent material such as glass or plastic. According to the preferred embodiment, tube 20 is formed of an acrylic plastic material. Tube 20 is in fluid communication with beverage chamber 14 through an upper liquid port 22 and lower liquid port 24. Stop elements 26 may be configured as bulb projections or a lip that spans the inner circumference of the tube and retain float 30 within the tube. A scale 40 is provided on housing 12 in close proximity to tube 20. The scale may include fractional markings 42, such as "½" or words such as "FULL" or "EMPTY".

According to the preferred embodiment, float 30 may be formed as a ball or spherical element and includes a temperature sensitive heat luminescent material. The heat sensitive, thermally activated luminescent or fluorescent material is non-toxic and commercially available.

An excellent example of another material that may be advantageously used to form the float is shown in U.S. Pat. No. 4,302,971. That patent discloses a liquid crystal temperature indicator for measuring human body temperature. The temperature indicator may be a cholesteric liquid crystal deposit with a coating to protect the deposit from attack by moisture or humidity. One of ordinary skill in the art would readily recognize that the transition temperature of the cholesteric liquid crystal deposit may be changed to indicate a change from hot coffee of about 212° to cold coffee of about 60°.

Figure 3:
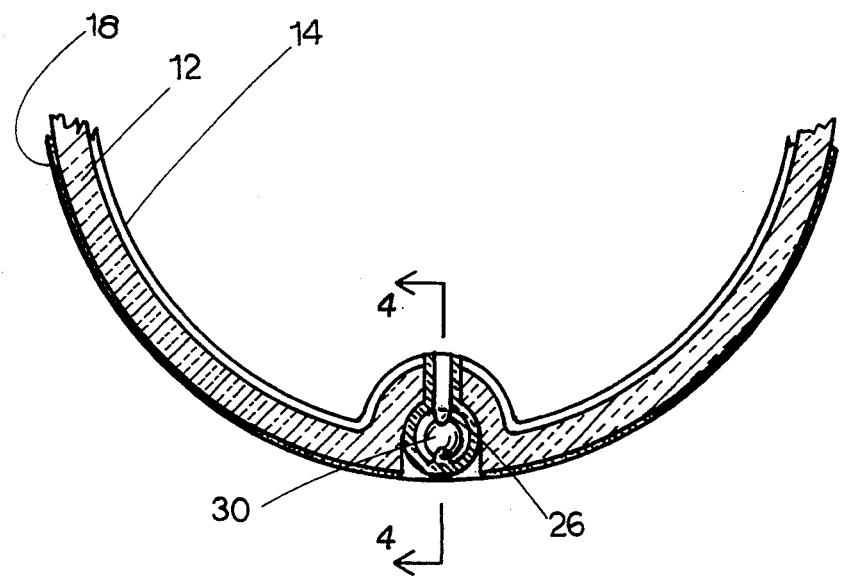
FIG. 3 is a partial cross-sectional view of the liquid container of FIG. 2.

FIG. 3 shows additional details of the liquid container. Beverage chamber 12 may be surrounded by insulated housing 12 and outer coating or skin 18, which may be formed of a more attractive or colored plastic material to enhance the appearance of the container. Substantially vertical tube 20 may include a pair of stop elements 26 for retaining float 30 within the tube.

Figure 4:
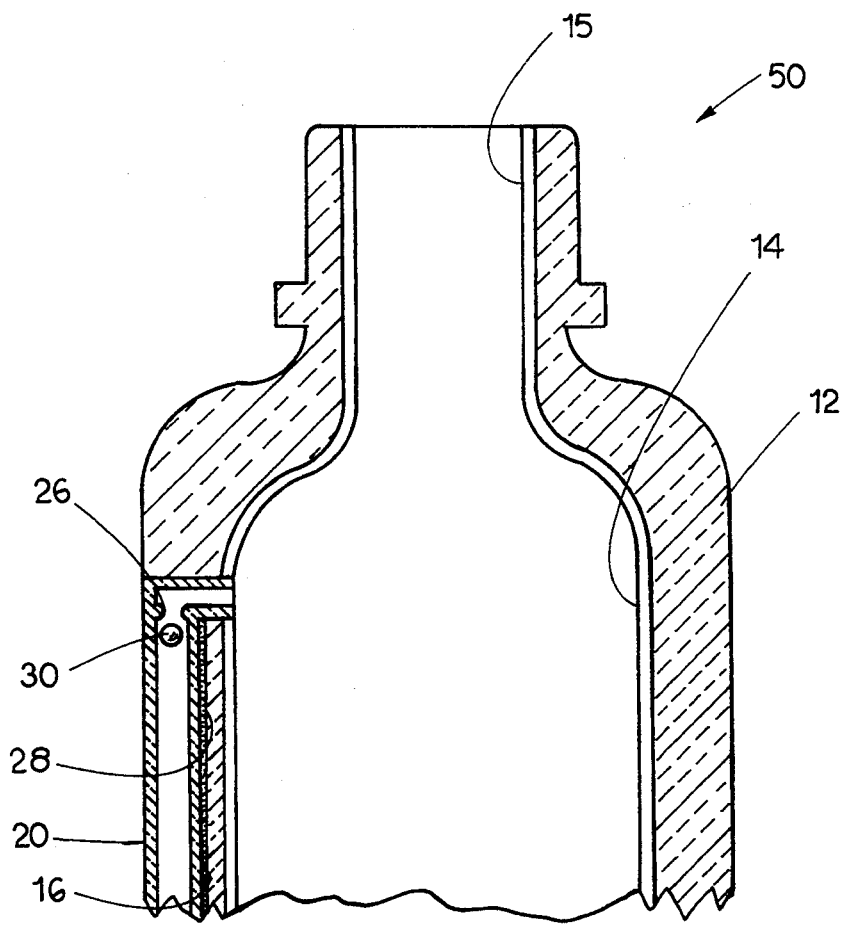
FIG. 4 is a partial cross-sectional view of the liquid container of FIG. 3, as modified to include a luminescent or fluorescent coating.

FIG. 4 shows a modified liquid container 50 for carrying a beverage. Liquid container 50 may include a handle (not shown), a housing 12 of insulated material, and a beverage chamber 14 formed of glass or plastic. The beverage chamber includes a mouth or opening 15. Housing 12 may include a slot 16 configured to receive a tube 20 having a coating of luminescent material 28. Float 30 may be formed from a temperature sensitive heat luminescent material. The heat sensitive, thermally activated luminescent or fluorescent material should be non-toxic and is commercially available.

Liquid container 50 is beneficial for a user such as a truck driver that consumes a heated beverage, such as coffee, while driving at night. Using a heat-sensitive thermoluminescent material indicates to the user whether the coffee is hot or cold. For example, the float may glow when the temperature of the coffee temperature is above 60°. Below 60° the float emits no light to indicate that the coffee is cold and does not provide the zesty flavor of hot coffee.

Alternatively a cholesteric liquid crystal deposit may be used in conjunction with a luminescent coating 28 that glows. As the coffee cools to a minimum acceptable level, i.e., 60°, the float changes color, for example, from orange to blue. Thus, a truck driver using liquid container 50 may advantageously detect two conditions of the coffee in low or no light conditions. First, the float is in fluid communication with the beverage chamber and accurately indicates the liquid level or amount of coffee remaining. Second, the luminescent nature or color-changing ability of the float indicates whether the coffee is hot or cold with respect to a predetermined transition temperature such as 60°. Of course, other transition temperatures up to about 95° may be chosen, so long as the selected transition temperature does not result in a liquid sufficiently hot to burn the user's tongue or mouth.

Figure 5:
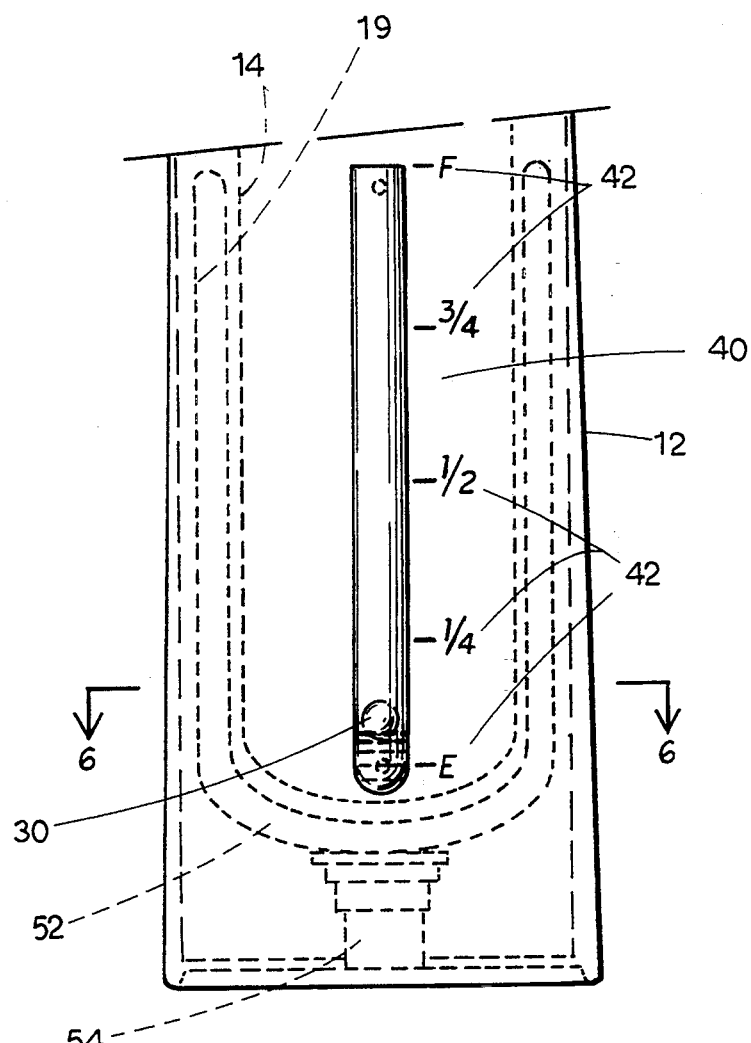
FIG. 5 is a partial front view of a vacuum bottle configuration of a liquid container according to the invention.
Figure 6:
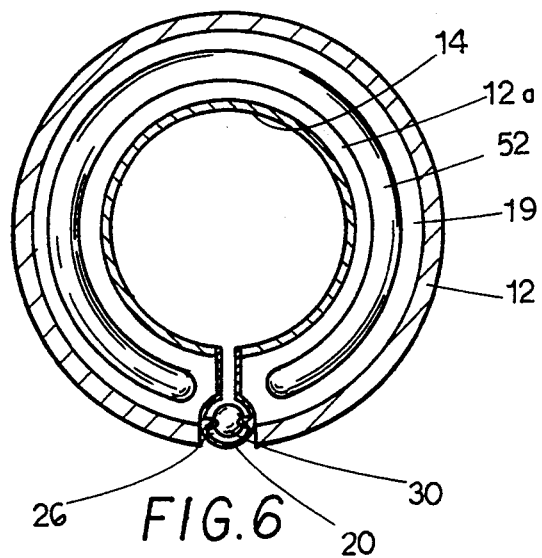
FIG. 6 is a cross-sectional view of the vacuum bottle of FIG. 5.

FIGS. 5 and 6 show a liquid container configured as a vacuum bottle or flask. The liquid container includes an insulated housing 12, a beverage chamber 14 and an outer chamber 19 and an inner chamber 12a that define a fluid evacuated area 52 therebetween. An evacuation port 54 may be used to evacuate region 52. A scale 40 including markings 42 may be associated with float 30 to indicate the liquid level. The scale may be made of the same material or other luminescent or fluorescent material as the scale for viewing in low or no light conditions also. In the event that a thermally activated material is used for the scale, the scale could be located near the interior of the container in close proximity to the heated liquid, and a transparent cover may surround the scale.

It is to be understood that the present invention is not limited to the preferred embodiments described above, but encompasses any and all embodiments within the scope of the following claims.

We claim:

1. A liquid container comprising:
   a housing;
   a beverage chamber located within said housing;
   a tube in fluid communication with said beverage chamber;
   indicating means for indicating a liquid temperature and a liquid level, said indicating means comprising a spherical float located within said tube, said float including at least a temperature sensitive material.

2. The liquid container according to claim 1, wherein said tube further comprises a stop element for retaining said indicating means within said tube.

3. The liquid container according to claim 2, wherein said housing further comprises a scale having at least a plurality of markings representing various liquid levels.

4. The liquid container according to claim 3, wherein said housing includes an insulated material for maintaining a temperature of a liquid within said inner chamber.

5. The liquid container according to claim 4, wherein said housing is configured as a vacuum bottle including an outer chamber defining an evacuated region for maintaining a temperature of a liquid within said beverage chamber.

6. The liquid container according to claim 5, further comprising illuminating means for illuminating said indicating means.

7. The liquid container according to claim 1, wherein said housing further comprises a scale having at least a plurality of markings representing various liquid levels.

8. The liquid container according to claim 1, wherein said housing includes an insulated material for maintaining a temperature of a liquid within said inner chamber.

9. The liquid-container according to claim 1, wherein said housing is configured as a vacuum bottle including an outer chamber defining an evacuated region for maintaining a temperature of a liquid within said beverage chamber.

10. The liquid container according to claim 1, further comprising illuminating means for illuminating said indicating means.

* * * * *